March 21, 1933.   W. B. KEE   1,902,705
HOE
Filed Oct. 21, 1932

Inventor,
WILLIAM B. KEE,

By Alexander M. Bunn
Attorney

Patented Mar. 21, 1933

1,902,705

UNITED STATES PATENT OFFICE

WILLIAM B. KEE, OF ATLANTA, GEORGIA

HOE

Application filed October 21, 1932. Serial No. 638,963.

This invention relates to garden or farm implements, and more specifically to a hoe-shaped structure designed especially to facilitate the removal of small roots, weeds and grass from the soil.

As will hereinafter more fully appear, the implement is fabricated to the general configuration of a hoe, and is also adapted to be utilized as a rake, one of the objects of the invention being the provision of a hoe-like structure which is provided with a plurality of downwardly-extending, spaced teeth which impart a rake-like formation to the instrument, and which are arranged in parallelism to form the cutting portion of the hoe.

One of the objects of the invention is the provision of means carried by the blade of the hoe whereby, during the chopping action of the hoe, to wedge the small stems and roots between the sides of adjacent teeth of the implement, to permit a subsequent tilting action of the latter to pull out the roots from the soil.

Other objects of the invention will be made apparent in the following specifications, when taken in connection with the drawing forming a part thereof.

Figure 1:
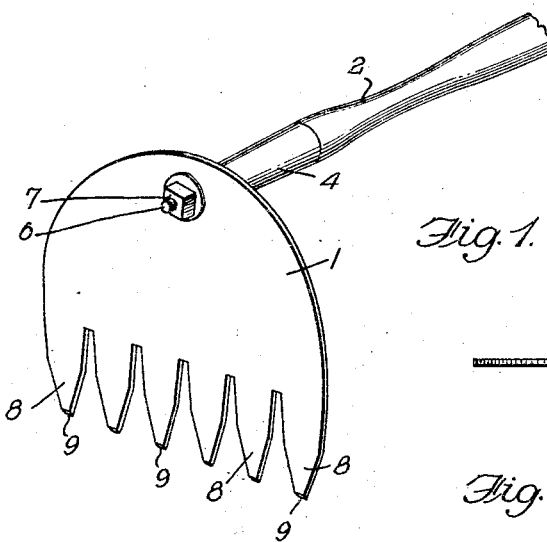
Fig. 1 is a perspective view of the implement, showing a portion of the operating handle.
Figure 3:
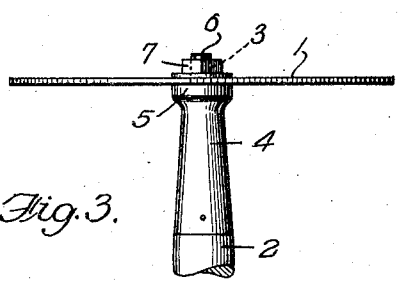
Fig. 3 is a plan view showing a means for connecting the blade of the implement to the handle therefor, and, Fig. 4 is a detail view illustrating the configuration of the spaced teeth of the implement.
Figure 4:
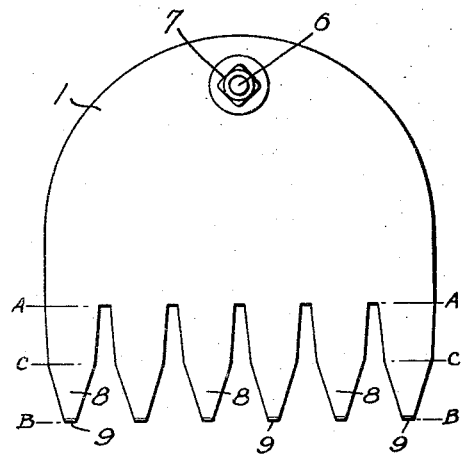

Now referring specifically to the drawing forming a part of this application, and in which like reference characters indicate like parts throughout the several views, the body or cutting portion of the implement, hereinafter called the hoe, is indicated by the numeral 1, and it may be formed with a rounded or straight upper edge as desired. A handle 2 is secured to the hoe, preferably extending through a suitably formed aperture 3 formed centrally of the top portion of body of the latter, as illustrated in Fig. 4 and fastened to the body thereof in any desired manner. In the preferred form of connection, as herein illustrated in Fig. 3, I provide a ferrule 4, which is operatively secured to the front end of the handle 2, the body portion adjacent the forward end of the ferrule terminating in an enlarged flange 5 which bears against the body 1 of the hoe, when in operative position, a screw-threaded stem 6, formed integral with the flange 5, extending through the aperture 3 and adapted to receive a nut 7, rotatable to secure the assembly into operative position, with the blade or body of the hoe 1 clamped between the nut 7 and the flange 5, as will be understood.

The lower or cutting edge of the hoe 1, is provided with a plurality of teeth 8, arranged in parallelism and spaced relation. Each tooth is of the same length, and has a reduced or somewhat sharpened cutting end 9, and the sides of each tooth, from the point where it is joined to the body portion 1, or on the line A—A, tapers downwardly and outwardly away from the adjacent tooth on each side, to the line C—C, whereby to provide a parallel row of downwardly extending, diverging, vertical slots which are located between the lines A—C. As clearly shown in the drawings the lower ends of the teeth 8, or the vertical portions thereof which lie between the lines C—C and B—B also are divergent each to each and taper at a more abrupt angle to form the points of the teeth in the line B—B.

Figure 2:
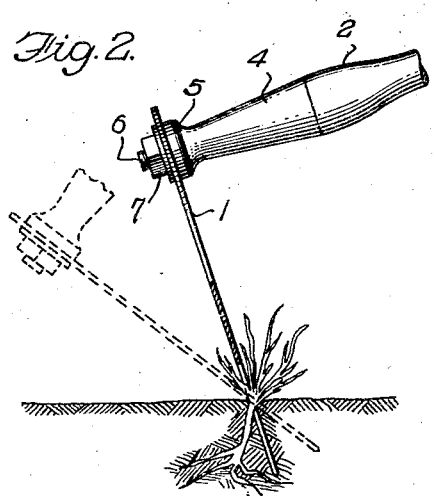
Fig. 2 is a side elevation illustrating the operation of the implement, a portion of the blade being shown in dotted lines.

In view of the foregoing description, the operation of my hoe, in the removal of weeds, stalks, grass etc., it will be noted that, upon the downward stroke of the hoe the relatively sharp teeth 8 enter the soil very easily, and the grass, stems and roots will be brushed sidewise by the lower tapering side of the teeth and forced upwardly between the restricted slots defined by the lines A—A and C—C. In this position the refuse which it is necessary to remove will become impacted in the narrowed tapering slots into which it is forced, and an upward push upon the hoe handle will easily pull the weeds, grass and roots out of the soil due to the leverage available from the relatively long handle of the hoe. This operation is illustrated in Fig. 2 of the drawing.

From the foregoing it will be manifest that I have provided a hoe-like weeding utensil which is adapted to operate with a maximum of efficiency in the work intended therefor, in that it will enter the soil more easily than the ordinary hoe, will automatically extract the roots of noxious plants, such as grass and weeds, and is operable to remove larger roots which become wedged in the relatively narrow slots in the upper portion of the body of the hoe, and which are easily extracted from the soil by the powerful leverage exerted by a forward push of the end of the hoe handle away from the operator.

Modifications of the structure herein described may be suggested to those skilled in the art to which it pertains, but my invention includes all embodiments falling fairly within the scope of the appended claim. It is to be understood that the handle may be of goose-neck formation adjacent its point of connection with the hoe blade, if deemed desirable.

I claim:—

An implement of the class described comprising a hoe structure provided with a body portion and a plurality of spaced, parallel, sharpened teeth extending from the body portion and adapted to enter the soil, each tooth having side edges in the plane of the adjacent teeth and provided with one angle of inclination extending from the points of each tooth to a point approximately one-half the length thereof, and with a continuing straight edge extending at a less angle of inclination to the point of merger with the body portion of the hoe, substantially as and for the purpose set forth.

In testimony whereof I affix my signature.

WILLIAM B. KEE.